United States Patent Office 3,538,169
Patented Nov. 3, 1970

3,538,169
PROCESS FOR THE MANUFACTURE OF 2,2,3-TRICHLOROBUTANE
Herbert Baader, Hermulheim, near Cologne, Kurt Sennewald, Knapsack, near Cologne, and Helmut Reis, Hurth, near Cologne, Germany, assignors to Knapsack Atkiengesellschaft, Knapsack, near Cologne, Germany, a corporation of Germany
No Drawing. Filed Mar. 20, 1967, Ser. No. 624,147
Claims priority, application Germany, Mar. 31, 1966, K 58,883
Int. Cl. C07c *17/08*
U.S. Cl. 260—658      7 Claims

ABSTRACT OF THE DISCLOSURE 2,2,3-trichlorobutane is prepared by reacting 2,3-dichlorobutene-(2) at high temperatures and high pressures with hydrogen chloride.

---

It is known that 2,2,3-trichlorobutane can be prepared inter alia by the chlorination of butene-(2), and that it can be used for the production of 2-chlorobutadiene-(1,3). To this end, the 2,2,3-trichlorobutane is subjected twice to dehydrochlorination by passing it through a tube heated to 600° C. Depending on the reaction conditions used, a single passage reaction through the tube is found to produce 2-chlorobutadiene-(1,3) and, in addition thereto, a mixture of dichlorobutenes. These are formed by an unrepeated dehydrochlorination and are normally mixed with fresh 2,2,3-trichlorobutane to be refluxed thereafter into the reactor to undergo further dehydrochlorination therein. The dichlorobutene mixture is formed of 1,2-dichlorobutene-(2), 2,3-dichlorobutene-(1), 1,3-dichlorobutene-(2) and 2,3-dichlorobutene-(2). Experiments have shown, for example, that the dehydrochlorination of 2,2,3-trichlorobutane at 440° C. in a stainless steel reactor produces 2-chlorobutadiene-(1,3) in a yield of 12% and, in addition thereto, an oily residue at a rate of 7%, and 2,3-dichlorobutene-(2) in a yield of 25%. The balance of 56% is formed of 1,2-dichlorobutene-(2), 1,3-dichlorobutene-(2) and 2,3-dichlorobutene-(1).

2,3-dichlorobutene-(2) subjected to dehydrochlorination is known to resinify and thereafter to produce practically no 2-chlorobutadiene-(1,3). A considerable disadvantage is therefrom seen to reside in the formation of 2,3-dichlorobutene-(2) on pyrolyzing 2,2,3-trichlorobutane, because the reactor, inside which the pyrolysis takes place, is found to be subject to clogging, due to resinification. It has therefore been necessary heretofore to isolate undesirable 2,3-dichlorobutene-(2) from further dichlorobutenes accompanying it, and to supply it to a combustion means in an attempt to recover the chlorine contained therein.

The process of the present invention, wherein undesirable 2,3-dichlorobutene-(2) originating from 2,2,3-trichlorobutane subjected to dehydrochlorination is additively combined with hydrogen chloride and thereby transformed again into 2,2,3-trichlorobutane as the starting material, has now been found substantially to obviate the disadvantage usually encountered in the production of 2-chlorobutadiene-(1,3) from 2,2,3-trichlorobutane.

The additive combination of gaseous hydrogen chloride with 2,3-dichlorobutene-(2) is achieved under pressure. To this end, 2,3-dichlorobutene-(2), present in pure liquid form or in admixture with a catalyst, is supplied to an autoclave and gaseous hydrogen chloride is forced to flow thereinto within some hours, under pressure, while the autoclave is simultaneously heated and agitated or shaken. In the absence of means for compressing the hydrogen chloride, the autoclave can be cooled, for example, down to 0° C. or less, hydrogen chloride supplied from a gas bottle is forced to flow thereinto, and the autoclave is thereafter heated anew.

The additive combination should be achieved at a temperature within the range of about 100 to 250° C., preferably 150 to 200° C. Substantially no additive combination occurs at temperatures lower than 100° C., whereas resinification and coking phenomena are predominant at temperatures above 250° C.

The pressure should vary between 150 and 300 atmospheres gauge, but higher pressures may basically be used.

The autoclave is conveniently made of stainless steel which is known to have a slight catalytic effect on the reaction. The addition of compounds, such as $SnCl_4$, $SbCl_5$, $HgCl_2$, $FeCl_3$, $TiCl_4$, $I_2$, $MgCl_2$ and $CuBr$, has no influence on the reaction yields, but the compounds are found to increase the conversion rate for an identical unit of time.

The reaction period comprises several hours. When hydrogen chloride ceases to be absorbed, the reaction product is removed from the autoclave and freed in customary manner from hydrogen chloride by scrubbing or distilling it. Unreacted 2,3-dichlorobutene-(2) is distilled off and used again in the process. The 2,2,3-trichlorobutane formed is distilled to free it from resinous residues, if any, and it can thereafter be reused for the production of 2-chlorobutadiene-(1,3).

The advantage offered by the additive combination of hydrogen chloride with 2,3-dichlorobutene-(2) resides in the fact that the 2,3-dichlorobutene-(2) obtained as a by-product can be utilized in the production of 2-chlorobutadiene-(1,3) from 2,2,3-trichlorobutane, and that this rather valuable material, which contains coniserable chlorine, need no longer be burnt. The present process utilizing 2,3-dichlorobutene-(2) also enables 2-chlorobutadiene-(1,3) to be obtained in improved yields from 2,2,3-trichlorobutane. In view of the fact that 2,3-dichlorobutene-(2) can also be prepared from butyne-(2), which is a waste-product originating from the production of butadiene-(1,3), it is clear that the present process also enables the waste butyne-(2) to be utilized in the manufacture of 2-chlorobutadiene-(1,3) from 2,2,3-trichlorobutane.

It is an unexpected result that the additive combination of hydrogen chloride with 2,3-dichlorobutene-(2) occurs only at temperatures higher than 100° C.; temperatures higher than 250° C. are, however, found to give rise to complete resinfication and coking. The reaction periods needed at that temperature range comprise several hours, yet only slight resinfication or polymerization occurs, despite the presence of metal chlorides and Lewis acids. These catalysts have rather been found to increase the conversion rates for an identical reaction period, without any loss in yield. It is interesting that even in the presence of those catalysts no rearrangement into further dichlorobutenes is observed.

The present invention relates more especially to a process for the manufacture of 2,2,3-trichlorobutane, wherein 2,3-dichlorobutene-(2) is reacted with hydrogen chloride at temperatures between 100 and 250° C., preferably between 150 and 200° C., and under high pressure, preferably under a pressure between 150 and 300 atmospheres gauge.

The reaction can be carried out in the presence of 0.5 to 10, preferably 0.5 to 5% by weight, referred to the 2,3-dichlorobutene-(2), of one or more of the compounds comprising stannic chloride, antimony pentachloride, mercuric chloride, ferric chloride, titanic chloride, iodine, magnesium chloride or cuprous bromide as the catalysts. The reaction time varies between 1 and 10, preferably 2 and 5 hours, and the reaction mixture is conveniently water-washed and distilled to separate it into its constituents.

EXAMPLE 1

250 grams 2,3-dichlorobutene-(2) (2 mols) and about 10 grams anhydrous stannic chloride were placed in a stainless steel autoclave provided with a stirrer and having a capacity of 780 cc. The autoclave was cooled down to 0° C. and 10 mols hydrogen chloride were forced to flow thereinto at that temperature, under a pressure of 35 atmospheres gauge. Thereafter, the autoclave was heated to 180° C., the pressure increasing to 280 atmospheres gauge. After 3 hours, the reaction product was discharged and freed from hydrogen chloride by washing it with water. The reaction product (260 grams) was distilled. 66.2 grams 2,2,3-trichlorobutane (0.41 mol; boiling point: 144° C.) were found to have been formed. 188.8 grams 2,3-dichlorobutene-(2) (1.5 mols; boiling point: 101° C.) remained unreacted. The conversion rate was found to be 24.5% and 2,2,3-trichlorobutane was obtained in a yield of 83.7%, referred to the 2,3-dichlorobutene-(2) transformed.

EXAMPLE 2

200 grams 2,3-dichlorobutene-(2) were reacted with 13.5 mols hydrogen chloride in a stainless steel autoclave having a capacity of 1 liter, under the reaction conditions described in Example 1, save that no stannic chloride was added. The conversion rate was 18.4% and 2,2,3-trichlorobutane was obtained in a yield of 80% referred to the conversion rate.

We claim:

1. A process for the manufacture of 2,2,3-trichlorobutane which comprises reacting 2,3-dichlorobutene-(2) with hydrogen chloride at a temperature between 150–250° C. and under a pressure between about 150–300 atmospheres gauge.

2. A process as claimed in claim 1, wherein the reaction is carried out at temperatures between 150 and 200° C.

3. A process as claimed in claim 1, wherein the reaction is carried out in the presence of a catalyst selected from the group consisting of stannic chloride, antimony pentachloride, mercuric chloride, ferric chloride, titanic chloride, iodine, magnesium chloride and cuprous bromide in the amount of 0.5 to 10% by weight of the 2,3-dichlorobutene-(2).

4. A process as claimed in claim 3, wherein the catalyst is used in a proportion of 0.5 to 5% by weight.

5. A process as claimed in claim 1, wherein the reaction is carried out within a period of time of 1 to 10 hours.

6. A process as claimed in claim 5, wherein the reaction is carried out within a period of time of about 2 to 5 hours.

7. A process as claimed in claim 1, wherein the reaction mixture is water-washed and distilled to separate it into its constituents.

References Cited

UNITED STATES PATENTS

| | | | |
|---|---|---|---|
| 1,900,276 | 3/1933 | Coleman | 260—658 |
| 1,990,968 | 2/1935 | Wiraut et al. | 260—658 XR |
| 2,007,144 | 7/1935 | Nutting et al | 260—658 XR |
| 2,209,000 | 7/1940 | Nutting et al. | 260—658 |
| 2,284,467 | 5/1942 | Ballard | 260—658 XR |
| 3,059,035 | 10/1962 | Benner et al | 260—658 |

FOREIGN PATENTS 570,831  2/1959  Canada.

HOWARD T. MARS, Primary Examiner

U.S. Cl. X.R.

260—655